US008829706B1

(12) United States Patent
Sammy

(10) Patent No.: US 8,829,706 B1
(45) Date of Patent: Sep. 9, 2014

(54) ADAPTIVE CONTROL DUCTED COMPOUND WIND TURBINE

(71) Applicant: Johann Quincy Sammy, Weymouth, MA (US)

(72) Inventor: Johann Quincy Sammy, Weymouth, MA (US)

( * ) Notice: Subject to any disclaimer, the term of this patent is extended or adjusted under 35 U.S.C. 154(b) by 0 days.

(21) Appl. No.: 13/844,604

(22) Filed: Mar. 15, 2013

Related U.S. Application Data

(63) Continuation-in-part of application No. 12/820,130, filed on Jun. 21, 2010, now Pat. No. 8,461,713.

(51) Int. Cl.
*F03D 9/00* (2006.01)
*H02P 9/04* (2006.01)
*B64C 3/00* (2006.01)
*B64C 11/00* (2006.01)

(52) U.S. Cl.
USPC ............... 290/55; 290/44; 244/207; 416/1; 416/91

(58) Field of Classification Search
CPC ... F03D 7/022; F03D 11/00; F05B 2240/122; Y02T 50/673; F15D 1/12
USPC ............. 290/44, 55; 244/207; 416/1, 91
See application file for complete search history.

(56) References Cited

U.S. PATENT DOCUMENTS

| | | | | |
|---|---|---|---|---|
| 1,714,609 A * | 5/1929 | Massey | ........................... | 244/10 |
| 2,809,793 A * | 10/1957 | Warner | ........................ | 244/208 |
| 3,178,131 A * | 4/1965 | Nikolaus | ........................ | 244/15 |
| 3,262,658 A * | 7/1966 | Reilly | ........................... | 244/207 |
| 4,021,135 A * | 5/1977 | Pedersen et al. | ............ | 415/208.2 |
| 4,024,409 A * | 5/1977 | Payne | ............................ | 290/55 |
| 4,075,500 A * | 2/1978 | Oman et al. | .................... | 290/55 |
| 4,117,995 A * | 10/1978 | Runge | ........................... | 244/207 |
| 4,285,482 A * | 8/1981 | Lewis | ............................ | 244/207 |
| 4,320,304 A * | 3/1982 | Karlsson et al. | ................ | 290/55 |
| 4,391,424 A * | 7/1983 | Bartoe, Jr. | ..................... | 244/207 |
| 4,641,799 A * | 2/1987 | Quast et al. | .................... | 244/207 |
| 4,848,701 A * | 7/1989 | Belloso | ........................ | 244/12.5 |
| 4,976,349 A * | 12/1990 | Adkins | ......................... | 244/207 |
| 5,158,251 A * | 10/1992 | Taylor | ........................ | 244/199.3 |
| 5,601,047 A * | 2/1997 | Shen | .............................. | 114/274 |
| 6,278,197 B1 * | 8/2001 | Appa | ............................... | 290/55 |
| 6,390,418 B1 * | 5/2002 | McCormick et al. | ......... | 244/204 |
| 6,905,092 B2 * | 6/2005 | Somers | ............................ | 244/3 |
| 6,948,910 B2 * | 9/2005 | Polacsek | ........................... | 416/1 |
| 7,104,498 B2 * | 9/2006 | Englar et al. | ................. | 244/12.6 |
| 7,134,631 B2 * | 11/2006 | Loth | ............................. | 244/209 |
| 7,143,983 B2 * | 12/2006 | McClure | ....................... | 244/204 |
| 8,506,244 B2 * | 8/2013 | McBride et al. | ............. | 415/204 |
| 2004/0009063 A1 * | 1/2004 | Polacsek | ........................... | 416/1 |
| 2010/0104436 A1 * | 4/2010 | Herr et al. | ....................... | 416/31 |
| 2011/0110777 A1 * | 5/2011 | Abdallah et al. | ................ | 416/23 |
| 2011/0142595 A1 * | 6/2011 | Santiago et al. | .............. | 415/4.3 |
| 2011/0206531 A1 * | 8/2011 | Kroo et al. | ..................... | 416/232 |
| 2011/0229321 A1 * | 9/2011 | Kilaras | ........................... | 416/1 |

(Continued)

FOREIGN PATENT DOCUMENTS

EP 2180182 A2 * 4/2010 ............... F03D 1/06

*Primary Examiner* — Pedro J Cuevas

(57) ABSTRACT

A high efficiency, adaptive control, compound ducted wind turbine capable of providing higher efficiency in energy extraction from a fluid. Performance of efficiency expressed as coefficient of performance (Cp) in accordance with the Lanchester-Betz-Joukowski limits is sustainable and significantly higher than an un-ducted, mono-propeller wind turbine of comparable diameter. Also an active circulation control wing technology is disclosed for increasing efficiency and performance and which is applicable to both wind and water turbines.

3 Claims, 19 Drawing Sheets

(56) References Cited

U.S. PATENT DOCUMENTS

2011/0274533 A1* 11/2011 Presz, Jr. et al. .................. 415/1
2012/0003090 A1* 1/2012 Smith et al. ..................... 416/91
2012/0014792 A1* 1/2012 Smith et al. ..................... 416/23
2012/0045329 A1* 2/2012 Smith et al. ...................... 416/1
2013/0284273 A1* 10/2013 Boespflug et al. .............. 137/13
2013/0315733 A1* 11/2013 Kweder et al. ................. 416/91

* cited by examiner

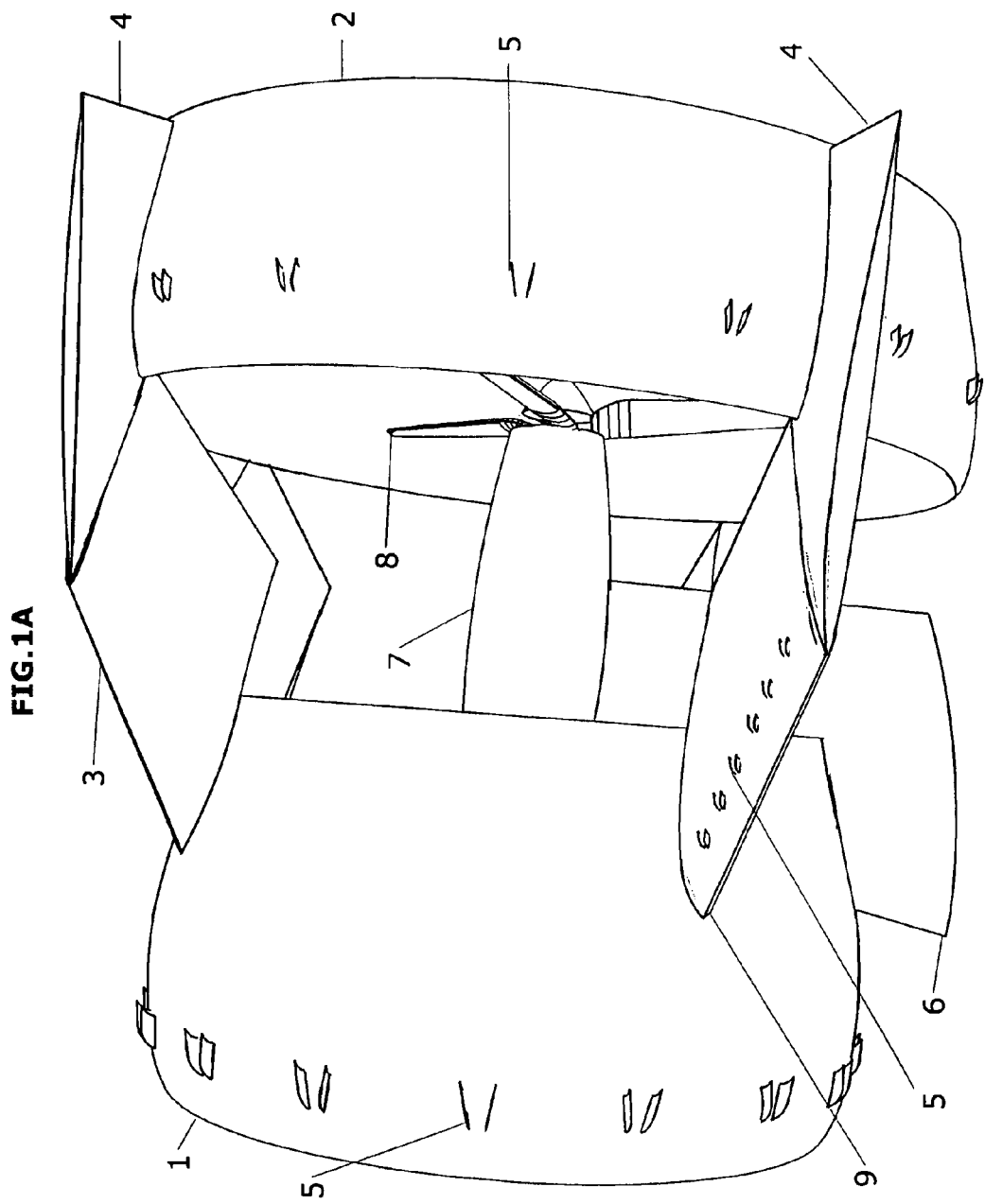

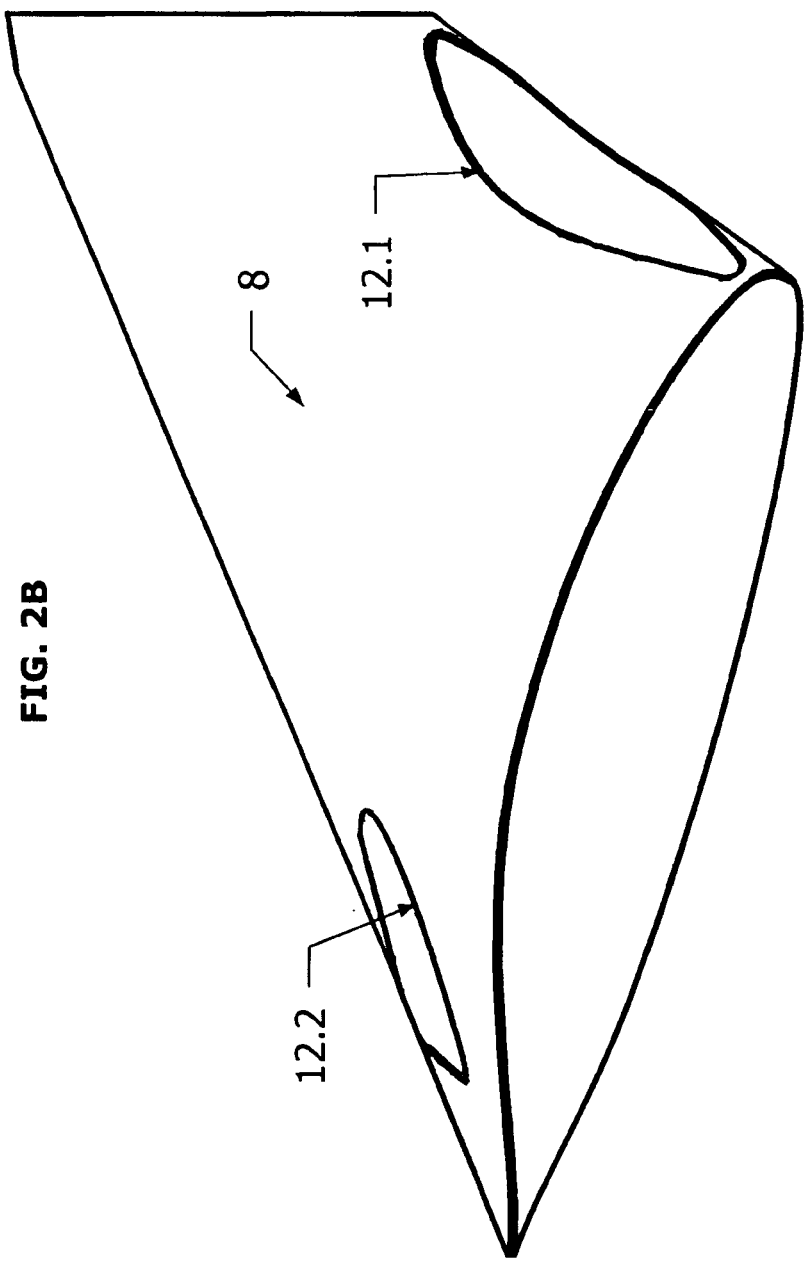

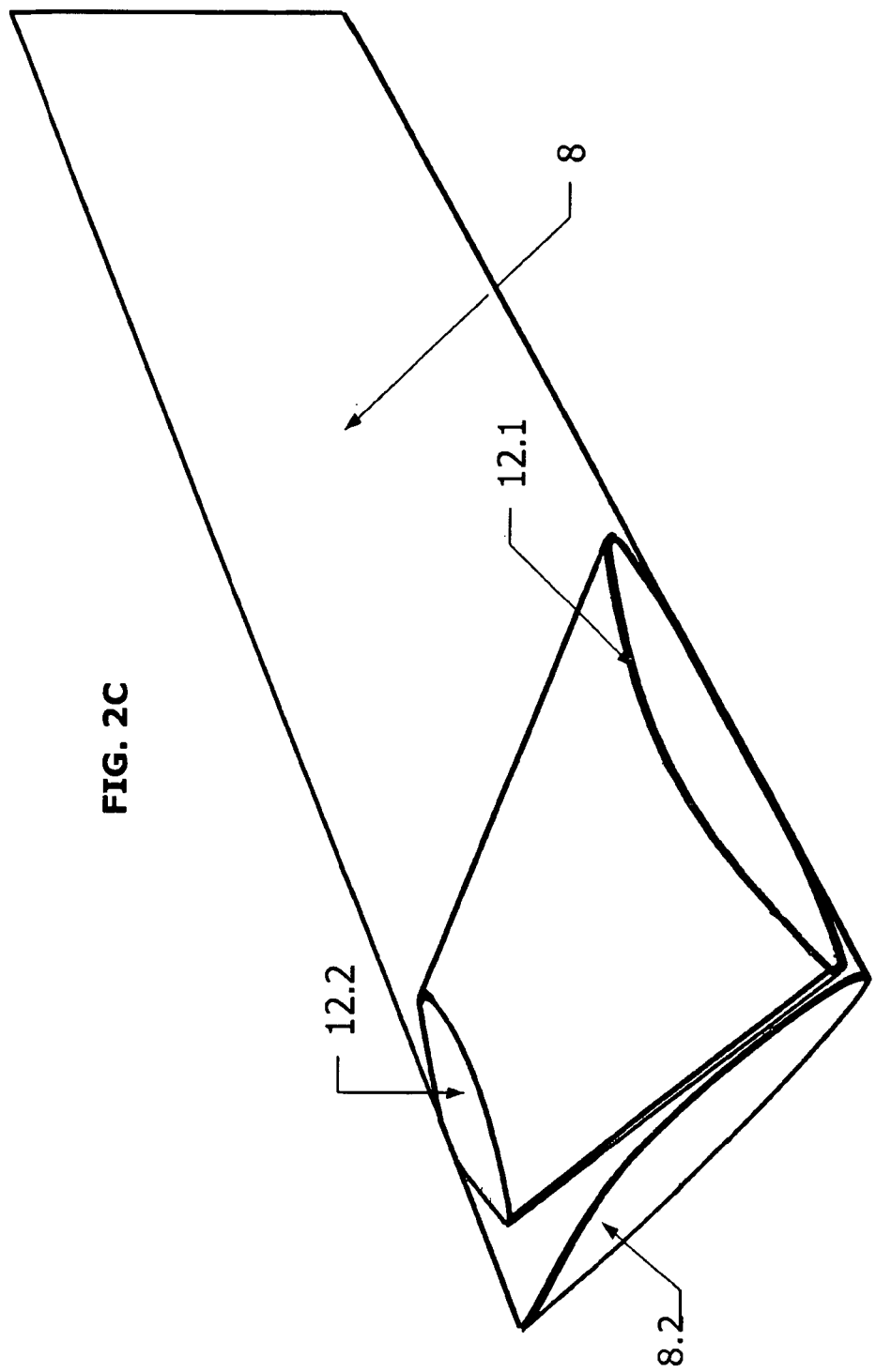

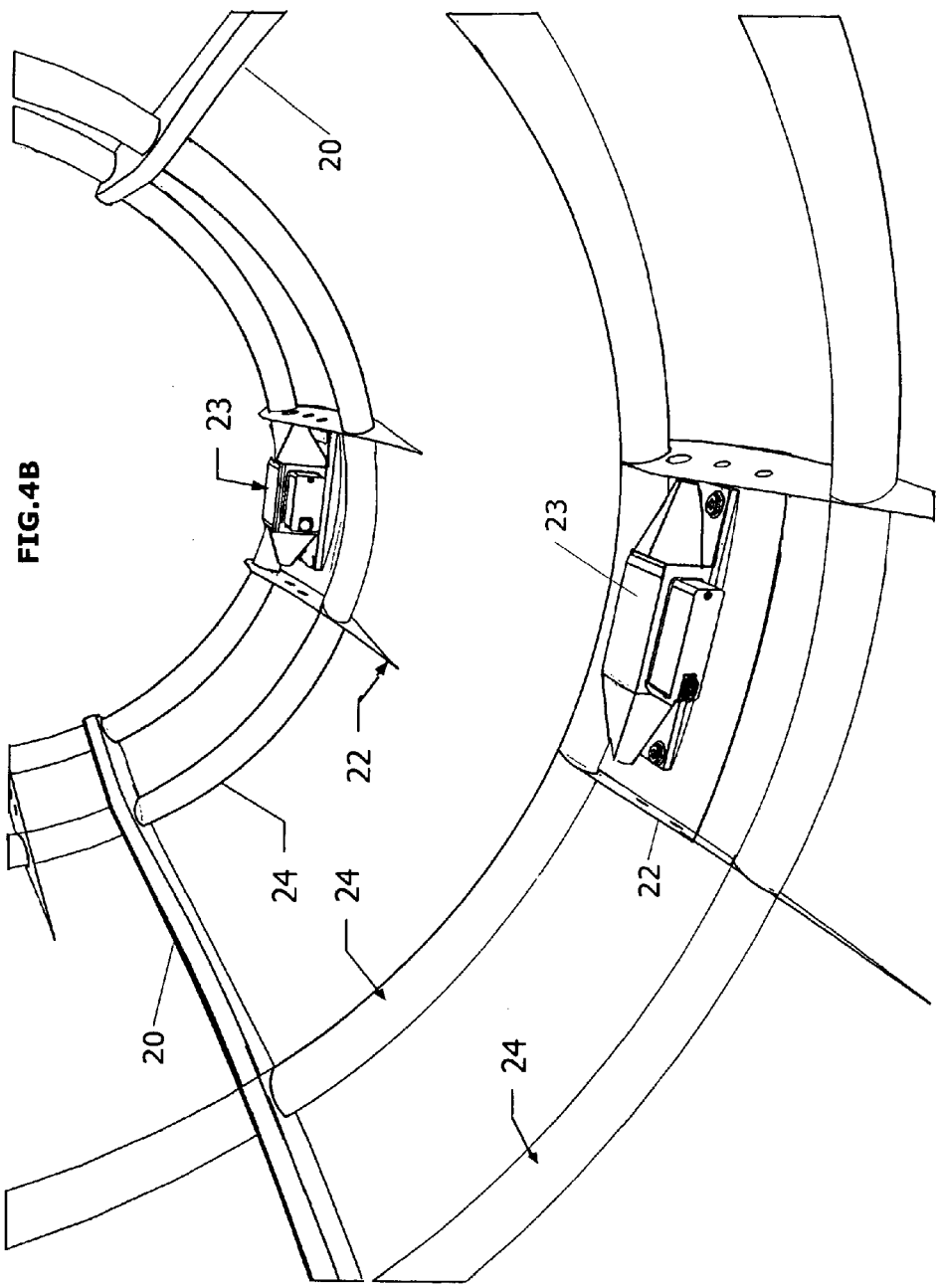

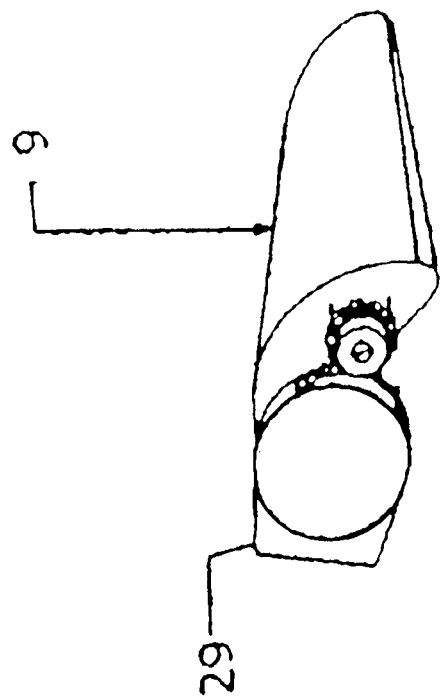
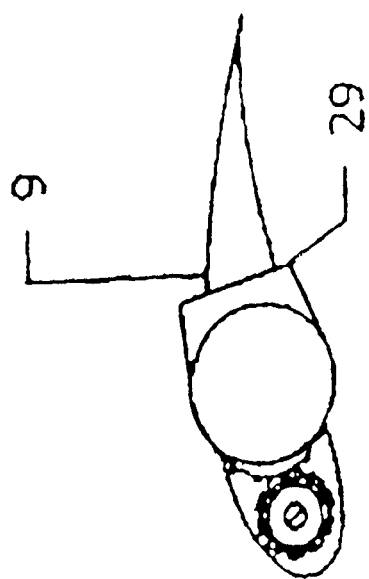
Fig. 5B
Fig. 5A

Outer annular surface (pressure side)

Inner annular surface (suction side)

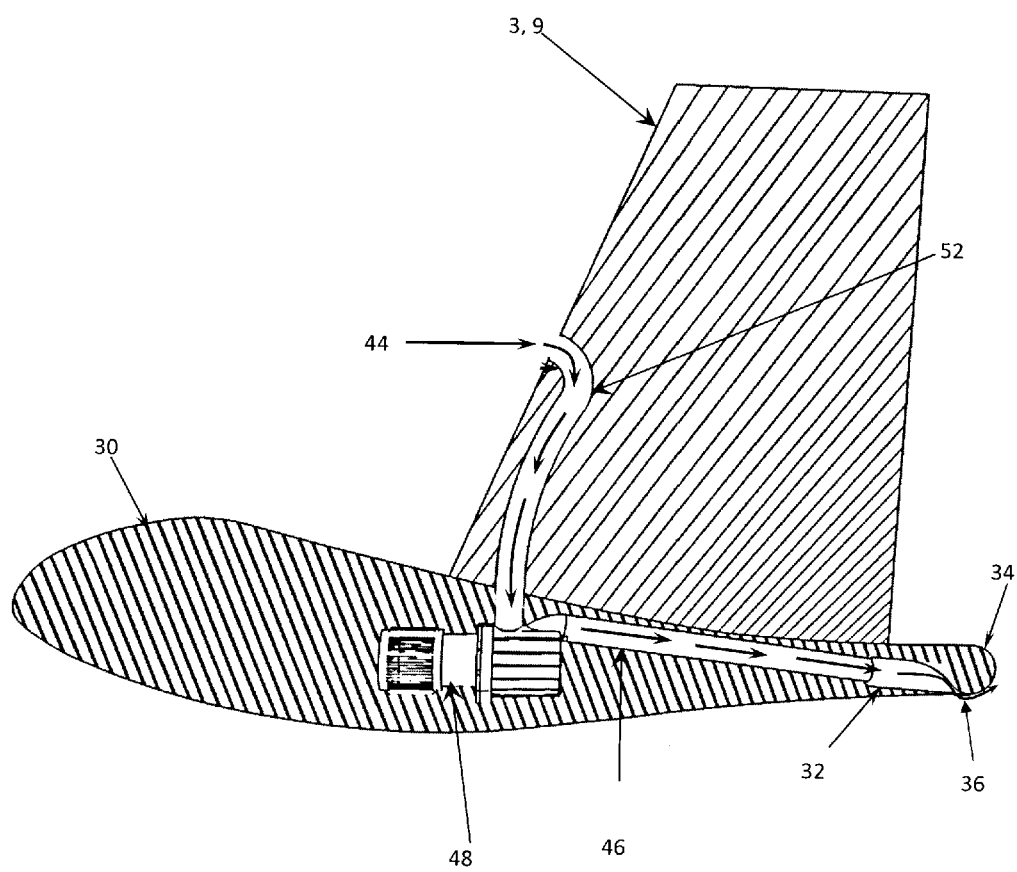

ADAPTIVE CONTROL DUCTED COMPOUND WIND TURBINE

RELATED APPLICATIONS

This application is a continuation-in-part of application Ser. No. 12/820,130 filed on Jun. 21, 2010 and is related to provisional application Ser. No. 61/219,347 filed on Jun. 22, 2009 and claims priority therefrom.

BACKGROUND

1. Field

This disclosure relates to wind turbines and wind collectors for horizontal axis wind turbines (HAWT) that are designed to harvest energy from the wind and transmit electrical energy to power storage or sent directly to end user for immediate energy consumption (grid-tied). More particularly, the present disclosure describes a compound rotor wind turbine that is enclosed within two separate annulus (annular wings) to provide for higher efficiencies in wind energy extraction based on coefficient of performance derived from the Lanchester-Betz-Joukowski limit.

2. Description of Related Art

Horizontal Axis Wind Turbines (HAWT) has been largely dominated by un-ducted/shrouded, mono-propeller turbine(s) as the primary configuration for wind energy extraction. The first documented patent for ducted/shrouded diffusers was the "Eolienne Bollee", issued to Ernest Sylvain Bollee and Auguste Sylvain Bollee of France in 1868, #79985 and revised in 1885-#167726. The Eolienne Bollee consisted of fixed stator(s) preceding the rotor enclosed within a duct. Diffuser Augmented Wind Turbines (DAWTS) pioneered by Grumman Aerospace, a type of HAWT, U.S. Pat. No. 4,075,500, "Variable Stator Diffuser Augmented Wind Turbine Electrical Generation System" issued Feb. 21, 1978 to Oman & Foreman describes a diffuser/shrouded augmented wind turbine with variable stators preceding the rotors to control flow onto the rotors and yaw alignment of the turbine system. The diffuser shroud which encases the vanes and rotors is as such where the inlet shroud for vane & rotor placement is significantly less in diameter than the flanged diffuser exit. Such design claims to induce lower pressure along the back face, trailing edge area, downstream of the spinning rotors thereby improving rotor efficiency and rotor rpm as well as augmenting mass flow entering ahead of the rotor blades which facilitates more power extraction from the usable wind supply per rotor diameter.

A second DAWT type system for HAWT is proposed by U.S. Pat. No. 7,018,166, "Ducted Wind Turbine", issued Mar. 28, 2006 to Gaskell featuring another diffuser shroud with two rotors, primary inlet rotor and second free rotor mounted downstream of the first rotor, outside of the diffuser shroud periphery. The blade tips of the free/second rotor are in the free-stream wind and a portion of the free or second rotor is exposed to the diffuser with supplemental force coming from the low pressure flow exiting the forward diffuser shroud. Both rotors are mechanically connected to a primary, generator. These types of diffuser/shrouded turbines have a primary purpose and that is concentrating or augmenting mass flow of the wind via the duct/shroud to improve rotor efficiency at the throat of a convergent/divergent diffuser for maximum velocities.

A problem common to diffuser type shrouds is flow separation from the shroud inner surface walls which negates the benefit of the diffuser shroud and causes pressure rise which may adversely affect rotor/propeller performance and thus harm efficiencies. Further, problems and complications of the diffuser design (DAWT) is the large exit to inlet (or nozzle to exit) diffuser ratios required, to form lower pressure gradients at exit. Additionally, low aspect ratio ducts, shrouds and diffuser in relation to the nozzle and exit area has led to problems with buffeting, yaw control due to air entrainment and high drag systems inherent in the design (higher pressure). Turbulent flow fields are also generated at the exit ducts of DAWTS, leading to efficiency and performance losses due to the increased diameter of irrotational and expanding wake flow.

Other concentrated wind systems or diffuser type systems for flow efficiency improvement in wind turbines, include prior art that attempt to maintain boundary air layer attachment at the diffuser walls by including orifices to re-direct free-stream airflow such as U.S. Pat. No. 4,075,500, previously cited, and U.S. Pat. No. 4,422,820, "Spoiler for Fluid Turbine Diffuser", issued Dec. 27, 1983 to Kirsch & Markow. U.S. Pat. No. 5,836,738, "Advanced SuperVenturi Power Source", Finney, describes three separate annulus merging flows to combine a singularity in flow stream to drive an actuator disk or turbine at the highest possible flow efficiency. All prior art of ducted (concentrator type)/diffuser augmented wind turbines (DAWTS) still do not address the problem of expanding irrotational wake flow that can disrupt flow and wind supply in a wind turbine array and lead to lower overall performance and degradation of efficiency of proximate wind turbines sited in wind farms because of turbulent flow. Furthermore, ducted/shrouded turbines of the prior art are prone to ice formation in freezing conditions due to the increase in wetted area of the duct. Ice-build up causes gross inefficiency and performance losses as the result of flow separation, blockage and change of surface geometry from ice accumulation.

The proposed art, Adaptive Control Ducted Compound Wind Turbine, takes a multidisciplinary approach to the design configuration, integrating ducted fan technology (aviation-aerodynamics), specifically the use of a positive cambered duct (airfoil geometry), vortex generators, internal duct heating to prevent ice formation, fixed and variable stator vane(s) and nacelle to augment, streamline and disrupt fluid flow in ducted fan/ducted wind turbine systems. The present embodiment and utility application is a continuation of U.S. Provisional Patent Application 61/219,347, "High Efficiency Ducted, Compound Rotor Turbine", Sammy (also author of present embodiment), describes a novel configuration for a ducted wind turbine applying ducted fan technology.

3. Background Description of Physical Operation of Wind Turbines

The theory predicting the maximum amount of useful power that can be extracted from fluid flow was first written by English aerodynamicists, F. W. Lanchester in 1915. In 1920 Alfred Betz, a German aerodynamicist, and Nikolai Zhukovsky also spelled Joukowski, a Russian aerodynamicist, both published their results independently on the same body of work relating to maximum power extraction from fluid flow in an propeller or airscrew. History has long recognized the Betz Limit, so named for Alfred Betz's publication in 1920 as the governing law of power extraction from fluid flow in wind turbines. In fairness to past researchers, all came to the same conclusion independently that the useful amount of power that can be extracted from fluid flow within a streamtube is 59.265% or as expressed as a coefficient of performance, $C_{.sub.p}=0.593$.

The reference to the maximum limit will then be cited throughout this publication as the Lanchester-Betz-Joukowski limit. Further work by Froude and Glauert resulted in reference to the wind turbine as an actuator disk, propeller/airscrew, deriving an axial induction factor (losses) of 33.33%, 0.3333 or ⅓. The axial induction factor represents the amount of losses of kinetic energy in the wind that is converted to heat then dissipated through viscous shear as it passes the actuator disk within the stream tube. ⅔ of the kinetic energy in the wind is then available for useful power extraction.

Further loss of efficiencies lowering coefficient of performance in wind turbines un-ducted/ducted is due but not limited to propeller, generator, gearbox, and transmission inefficiencies, and poor yawing reaction control—a function of unsteady aerodynamics in wind turbines.

4. Background Description of Non-Planar Surfaces/Wings

Annular Wings are non-planar surfaces that may have a toroidal geometry in its most basic form. The benefits of non-planar wings have been documented theoretically and experimentally. Much research has shown that non-planar surfaces (annular wings, a.k.a. ring wings) significantly reduce wave drag due to high Oswald (span wise) efficiencies. Early study on non-planar wings conducted by Prandtl and Munk investigated the physics and determined theoretical calculations for non-planar wings in the form of bi-planes. Non-planarity for confined wingspan improves wing efficiency by capturing a larger volume of air to generate lift.

BRIEF DESCRIPTION OF THE DRAWINGS

FIGS. 1A-1E depicts the two positive cambered annulus, ducts, compound turbine-propellers, vanes, nacelle, vortex generators, stakes, generators and inverters, electro-mechanical airfoil rotation apparatus, and general arrangement of the complete system in perspective, side and front views in which FIG. 1A is a side view, FIG. 1B is a front and side perspective view, FIG. 1C is a rear view, FIG. 1D is a top view and FIG. 1E is a cross-section view showing the generator and inverter apparatus inside the turbine.

FIGS. 2A-2C depict respectively a planform view, a perspective and a side view of the propeller with non-planar elliptical winglet.

FIGS. 4A and 4B depict a framed view of an embodiment with internal heating units.

FIGS. 5A and 5B depict respectively a side view and an angled view of a horizontal stabilizer with electro-mechanical apparatus for rotation about a pitch axis.

FIGS. 6A and 6B show a sectional view in which FIG. 6A is a full view and FIG. 6B is an enlarged partial view of the basic geometry of an active circulation control body for aero-hydro foil.

FIG. 7A shows a sectional view of an air or water pump within a cavity of the circulation control aero-hydro foil, and general configuration of internal orifices, manifold and plenum with fluid inlet and exit for a wind or marine hydro-kinetic turbine system.

DESCRIPTION OF PREFERRED EMBODIMENT

Figure 1B:
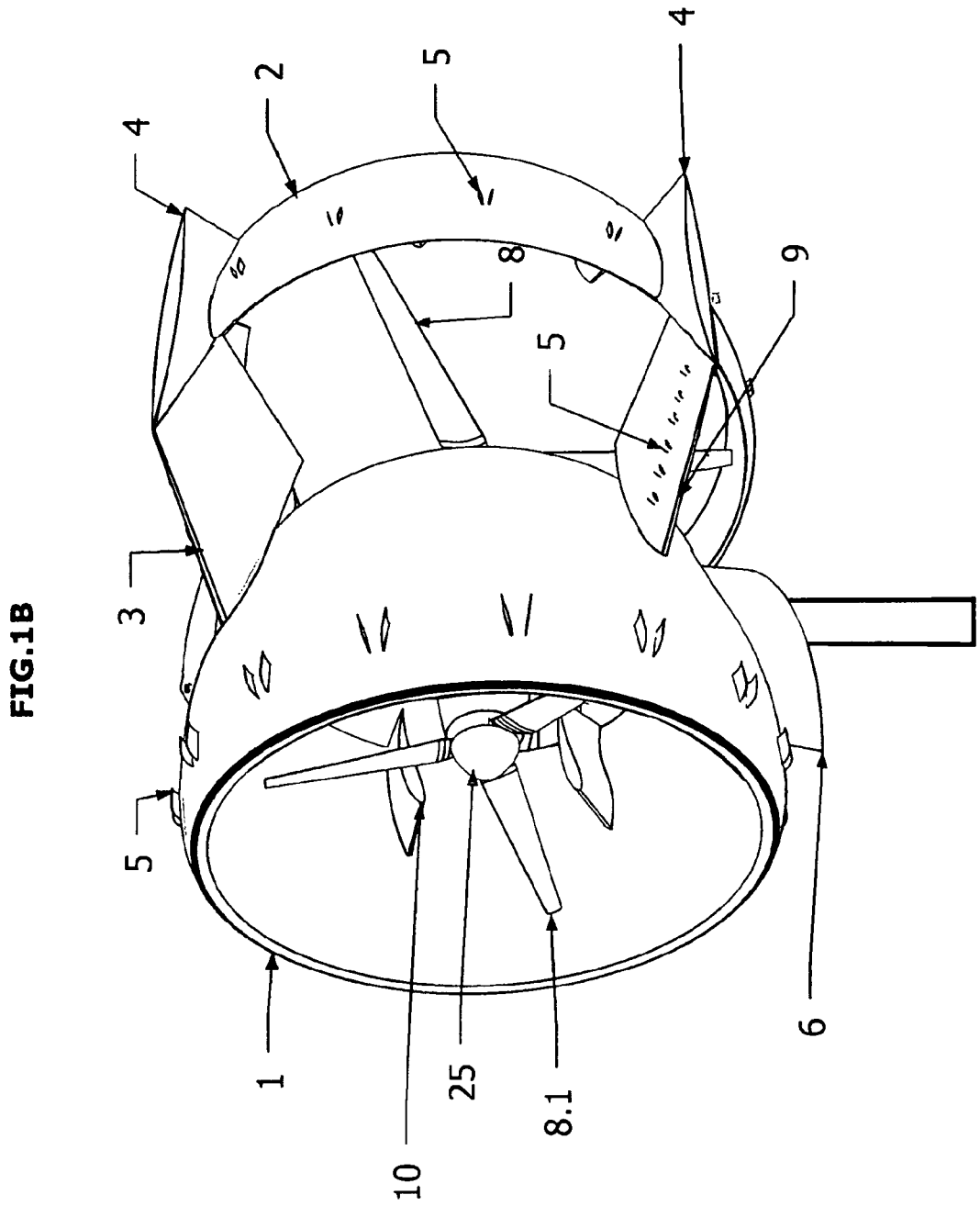

Embodiments of the present invention provide for a compound, dual annulus/annular wing, counter rotating propeller blades, dual rotor/turbine system, consisting of variable and/or fixed vanes on the inner walls, horizontal and vertical stabilizers connecting the forward and after ducts, and vortex generators for flow attachment along the inner/outer duct walls circumferentially arranged for efficient harvesting of wind energy. The performance of rotors/propellers/fans within a shroud or duct improve turbine efficiency by minimizing losses at the rotor/propeller tip, provided suitable clearance between the propeller tip and shroud are met in these axial flow systems.

Ducted propellers/ducted fans provide high static thrust per rotor diameter than an un-ducted propeller. Un-ducted, mono-propeller HAWT turbines deflect away a significant portion of the incoming free-stream resulting in lower turbine efficiency and power production and vortex shedding also creates turbulence at the blade tip. As well, flow efficiencies are also lost in un-ducted, mono-propeller systems as wind flow passes through the propeller in these axial flow systems. The energy in the wind that is lost due to deflection, tip clearance, vortex shedding, and flow through the propellers cannot be recovered and extracted in conventional un-ducted, mono-propeller systems.

Lanchester-Betz-Joukowski law limits the maximum energy conversion efficiency of 59.23% when the axial wind speed is reduced by ⅔rd across a single rotor disc. However, practical wind turbines convert significantly less than 40% of the power available in the wind per rotor sweep area into electrical energy. Hence, nearly 60% of the potential wind power per rotor swept area escapes without being harnessed. The primary reason may be that a single rotor cannot be designed to achieve large changes in velocity or enthalpy. However, a compound turbine system provides more rotor sweep area than a single, mono-propeller system of the same diameter. The power output of a wind turbine is directly related to the swept area of its blades. The larger the diameter of its blades, the more power it is capable of extracting from the wind. Power captured by the rotor is linear. If the swept area is doubled as in the present embodiment, then so to be the amount of energy it can capture.

One embodiment of the present invention is the use of counter rotating, dual turbine/propellers to increase energy harvesting through enlarged sweep area. The counter-rotating system reduces bending stress on the tower on which the turbine system may be mounted. This reduced bending stress results when the torques produced by two rotors counterbalance each other.

The present embodiment of positive cambered annulus ducts is designed to maximize the flow field along the inner duct wall and also at the outer duct walls for the benefit of streamlining flow through the duct (maintain flow attachment) and to direct high velocity flow to the after turbine tips to begin rotation, as well as maintain a low pressure area downstream of the forward propeller.

Free-stream wind flow approaching the embodiment in practical operation is often turbulent flow. Unsteady aerodynamics in the form of wind shear, rapidly shift cross-wind, gusting winds, and gale force wind is a cause of flow separation common to ducted/shrouded/diffuser turbines.

Vortex generators are commonly used in aviation, situated along the leading edge as a percentage to chord to delay flow separation. Flow separation can be a potential problem in ducted as well as un-ducted wind turbine systems. Vortex generators delay flow separation. Vortex generators are positioned in the annulus leading edge annular wing and are affixed in such a way that they have an angle of attack a.o.a. with respect to the local airflow. In addition, the use of vortex generators augments the stream wise vorticity within a separating boundary layer, increasing the fluid momentum near the surface and thus delaying separation.

The vortex generators create a tip vortex which draws energetic, rapidly-moving air from outside the slow-moving boundary layer into contact with the annulus skin. The boundary layer normally thickens as it moves along the annulus inner/outer surface, creating areas of high pressure. Vortex generators remedy this problem by re-energizing the boundary layer at the annulus inner/outer surfaces. In the annulus, vortex generators delay flow separation and aerodynamic stalling. This benefit translates into lower pressure areas behind the turbine rotors, which directly improve rotor efficiency. Vortex generators are also positioned span wise along the inner/outer guide vanes to delay flow separation as the flow downstream of the forward propeller is de-swirled straightened, accelerated and directed onto the after turbine by the inner/outer vanes. The vanes are positioned as to redirect the flow in the opposite rotation of the forward turbine plane of rotation.

Airfoil design for the annular wings may consist of a specific geometry. Optimal loaded airfoils are laminar type airfoils. Further, wind tunnel test using a variant of the NASA supercritical body of revolution class airfoil for the annular wings exhibited lift coefficients of 1.2 to 1.5 at wind speeds up to 165 mph from angles of attack ranging from 0 to 10 degrees.

FIGS. 1A-1D show the complete arrangement of the present embodiment in series order facing the oncoming wind from the left in FIG. 1a. The forward annulus 1 is of shorter diameter and is generally of longer chord than the after annulus 2 which is generally of larger diameter and may be of shorter chord than the forward annulus 1 to expose an optimum percent span of the propeller/turbine/rotor blades within the periphery of the after annulus 2 to the on-coming free stream wind, but be placed outside the periphery of the forward annulus 1. The after propeller 8 is typically of larger diameter than the forward propeller 8.1 depicted in FIG. 1B to maintain blade tip (span wise) placement of the after propeller 8 outside the periphery of the forward annulus 1 but within the periphery of the after annulus 2. Vortex generators 5 are positioned along the leading edge upper surface of the lower horizontal stabilizers 9 and along the forward annular wing 1 and after annular wing 2 leading edge upper surfaces. The upper vertical stabilizer 3 arranges for passive yaw of the embodiment. The after annular wing 2 strakes 4 direct the outer flow across the top surface of the after annular wing 2.

The spinner assembly 25 depicted in FIG. 1B directs the oncoming free stream wind up and toward the forward propeller 8.1 to streamline flow onto the propeller face. The nacelle 7 houses the generators, gearboxes, drive-shafts and a majority of all other internal accessories and equipment (not shown) deemed necessary for operation of the present embodiment. The nacelle 7 is a conical shape airfoil. The present embodiment depicts a Sears-Haack type body, which has known properties of low wave drag.

FIG. 1B illustrates two cantilevered upper vertical stabilizers 3 positioned between the forward annular wing 1 mid body and after annular wing 2 leading edge is part of the yaw reaction control system. The vertical stabilizer 3 may be passively oriented which would include fixed mount to the after annulus 2 at varying angles of incidence from 0 to 25 degrees. The vertical stabilizer 3 passively aligns with the wind due to its broad surface area rising vertically and cantilevered. Extending horizontally aft taking a streamlined geometry as depicted in FIG. 1B, the lower horizontal stabilizers 9 may be actively controlled via direct drive servo-actuator motor (not shown) along the yaw axis for active yaw control with the use of gyroscopic devices, accelerometer and anemometers. The lower horizontal stabilizers 9 are positioned between the forward annular wing 1 lower mid body and the after annular wing 2 lower leading edge. The lower horizontal stabilizers 9 are part of the pitch reaction control system to the vertical stabilizer 3 and extend outwardly in opposing directions perpendicular to the vertical stabilizer 3. The horizontal stabilizer 9 minimizes pitching and buffeting from the free-stream wind which may be the result of the annulus 1 and 2. The lower horizontal stabilizers 9 are positioned aft of the center of gravity of the complete system as illustrated in FIG. 1A and FIG. 1B and is anhedral in span wise planform.

Figure 1C:
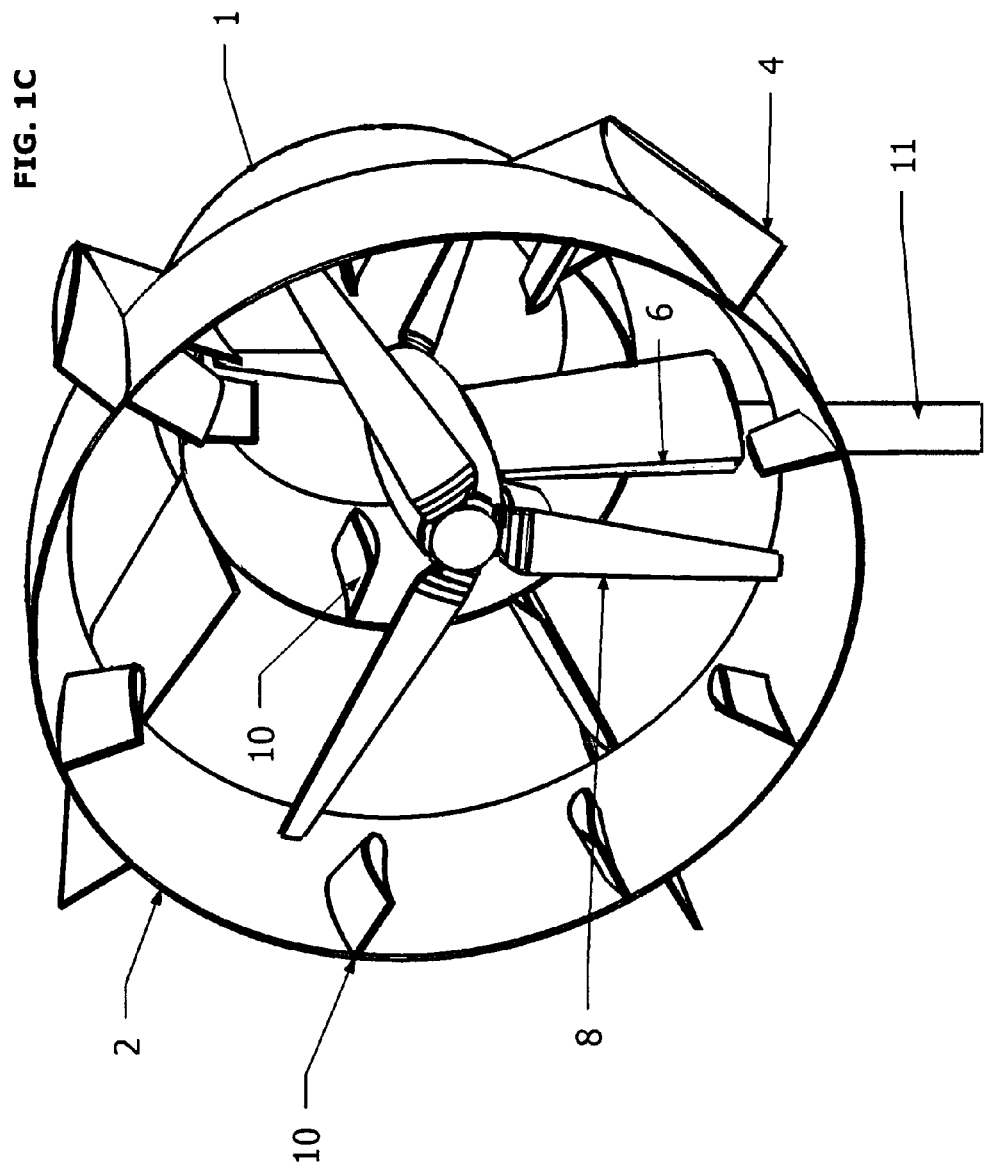
Figure 3A:
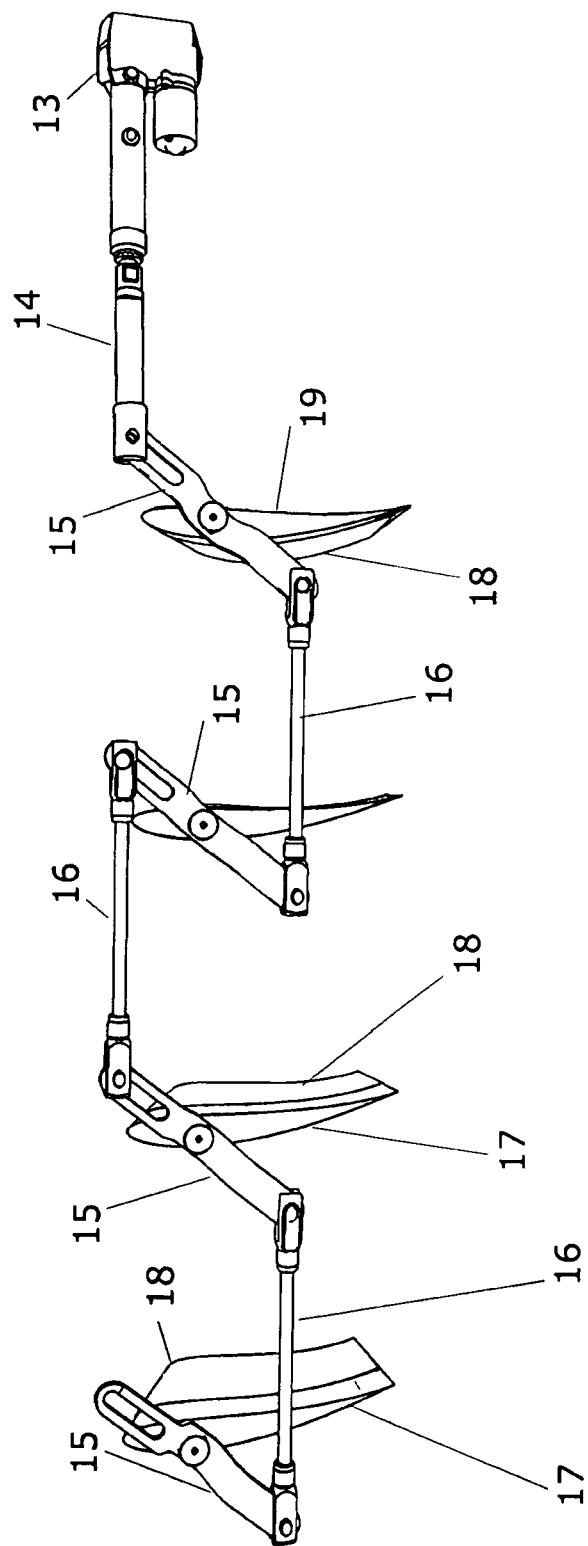
FIGS. 3A-3C illustrate the construction and functioning of stator vanes equipped with mechanism for variable operation.
Figure 3B:
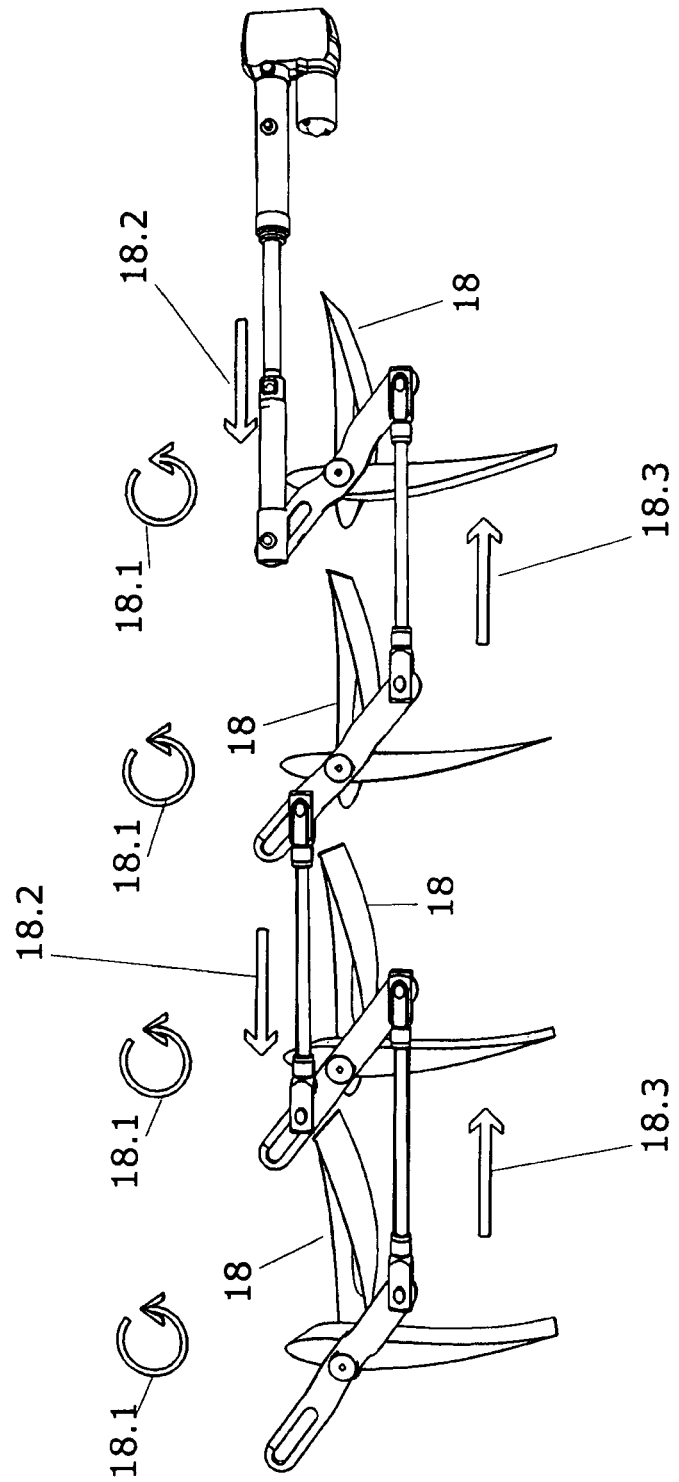
Figure 3C:
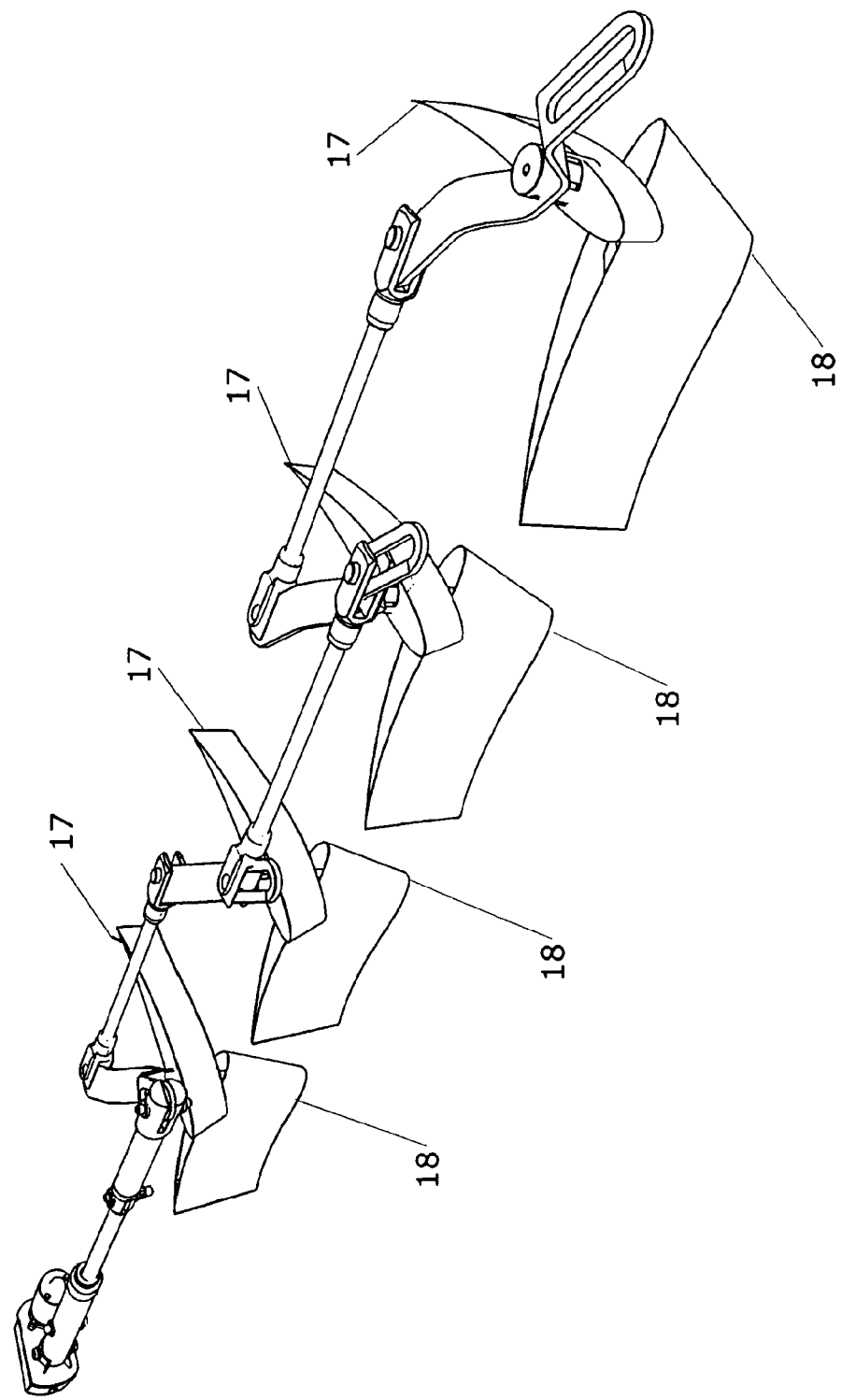

The present embodiment, FIG. 1C, rear view looking forward, is mounted on a tower support structure 11 in such a manner that is mounted with accommodation for passive yaw control or 360 degree rotation. The present embodiment as depicted in FIGS. 1A-1C is designed as a modular unit with all systems attached and when mounted to a separate detached tower 11 or other support structure, it is affixed through coupling (not shown) with freedom of rotation along its yaw axis. The entire embodiment as shown in FIGS. 1A-1D is mounted at an optimal angle of attack relative to the oncoming wind direction. A plurality of stator vanes 10 is depicted and are arranged circumferentially to the tangent slipstream wake flow of the propeller. The stator vanes 10 are mounted so that the suction side of the airfoil or upper surface of the airfoil is in contact with the contra-rotating wake of the propellers 8 and 8.1, FIG. 1B and streamlines or straightens this contra-flow returning it laminar. The vanes 10 FIGS. 1B-1C may be fixed mounted or variably mounted and sensor controlled for optimal propeller 8 and 8.1 FIG. 1B loading and to disrupt expanding flow fields in a wind turbine array through actuation of the variable stator vanes 17 and 18 as illustrated in FIGS. 3A-3C.

FIG. 1C also illustrates the separate tower 11, strake 4, forward annulus 1, after annulus 2, stator guide vanes 10 in rear looking forward view. Arranged circumferentially on the outer wall of the forward annulus 1 trailing edge are a plurality of stator guide vanes 10 tangentially spaced. The pluralities of stator guide vanes 10 direct, accelerate, and de-swirl the turbulent free stream wind exiting the forward 1 and the after annular wing 2.

Figure 1D:
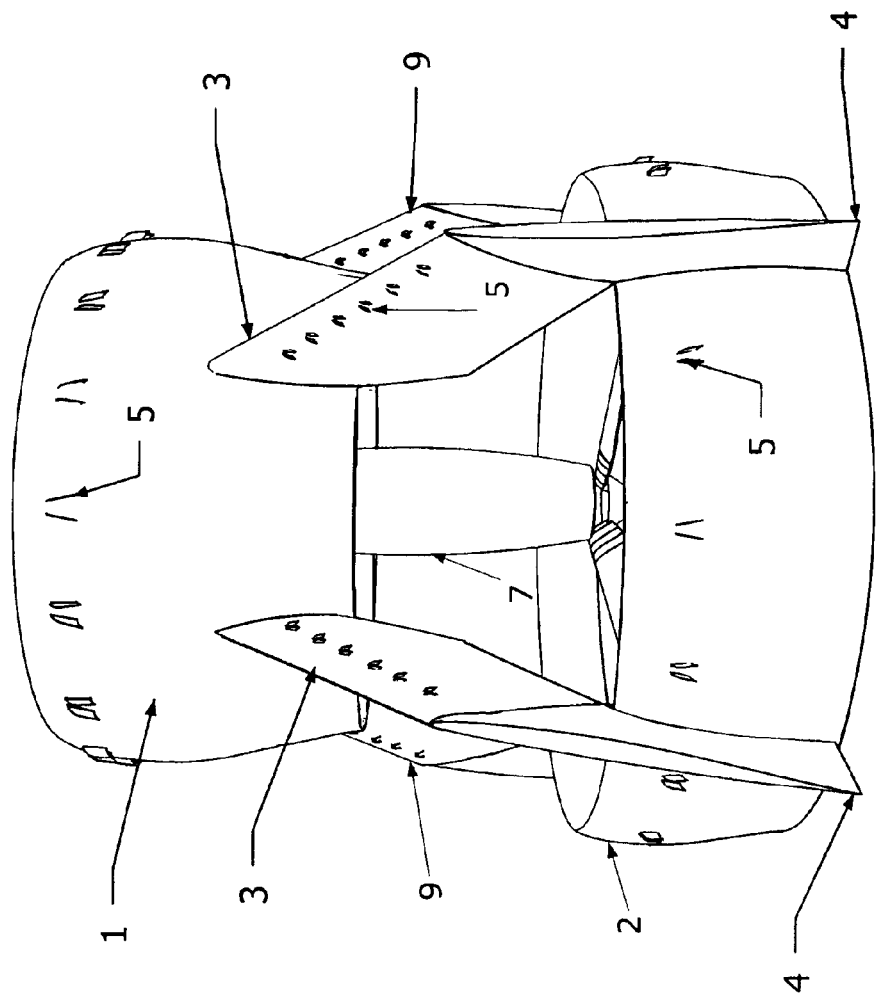

FIG. 1D depicts a top view of the complete present embodiment. A plurality of outer surface vortex generators 5 in pairs are arranged circumferentially as a percentage to chord and boundary layer to maintain laminar flow attachment on the annular wings 1 and 2, horizontal stabilizers 9, and vertical stabilizers 3.

Figure 1E:
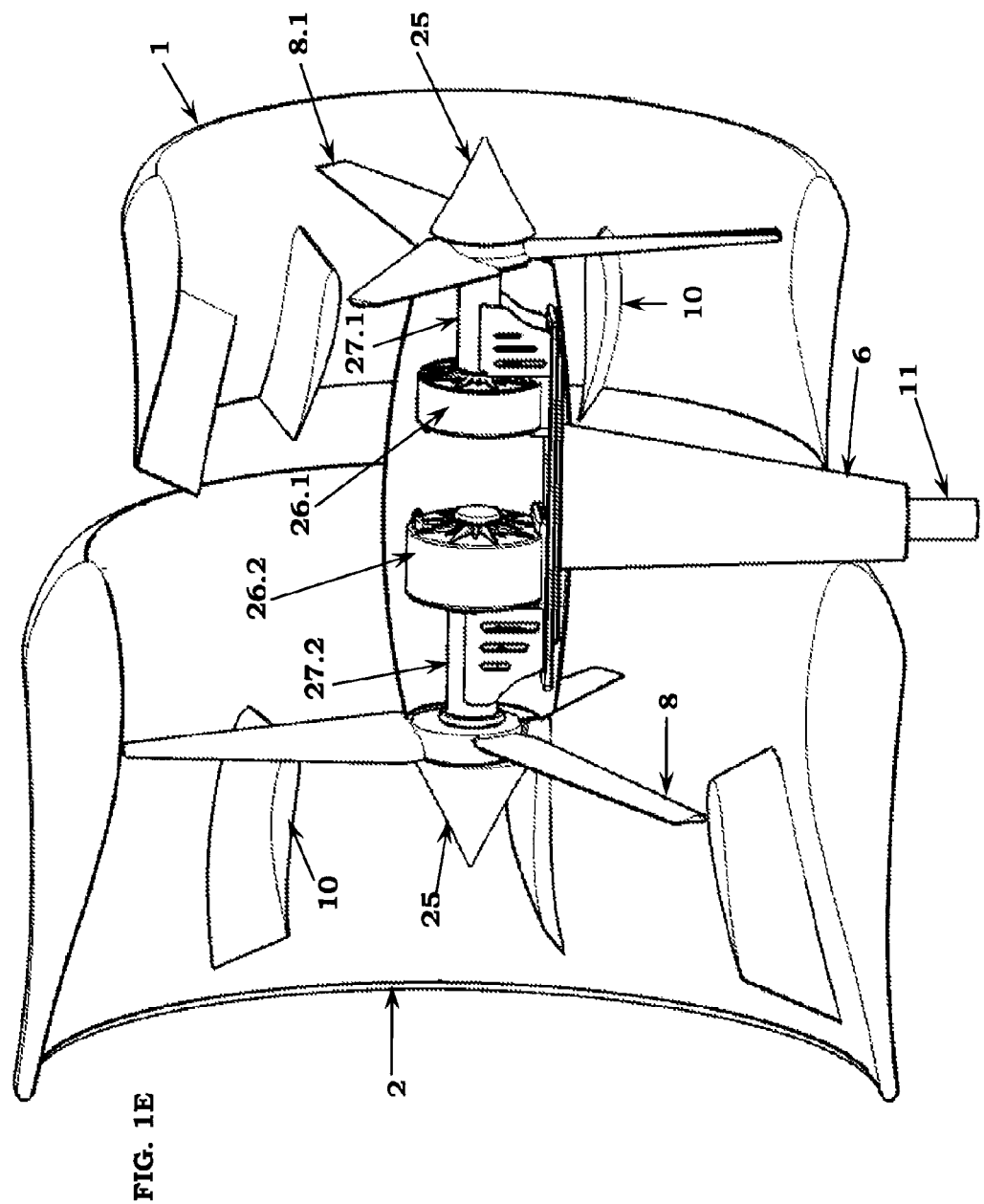

As shown in FIG. 1E the wind turbine is typically equipped with generators 26.1 and 26.2 and inverters 27.1 and 27.2 respectively connected to the forward and rear turbines.

Figure 2A:
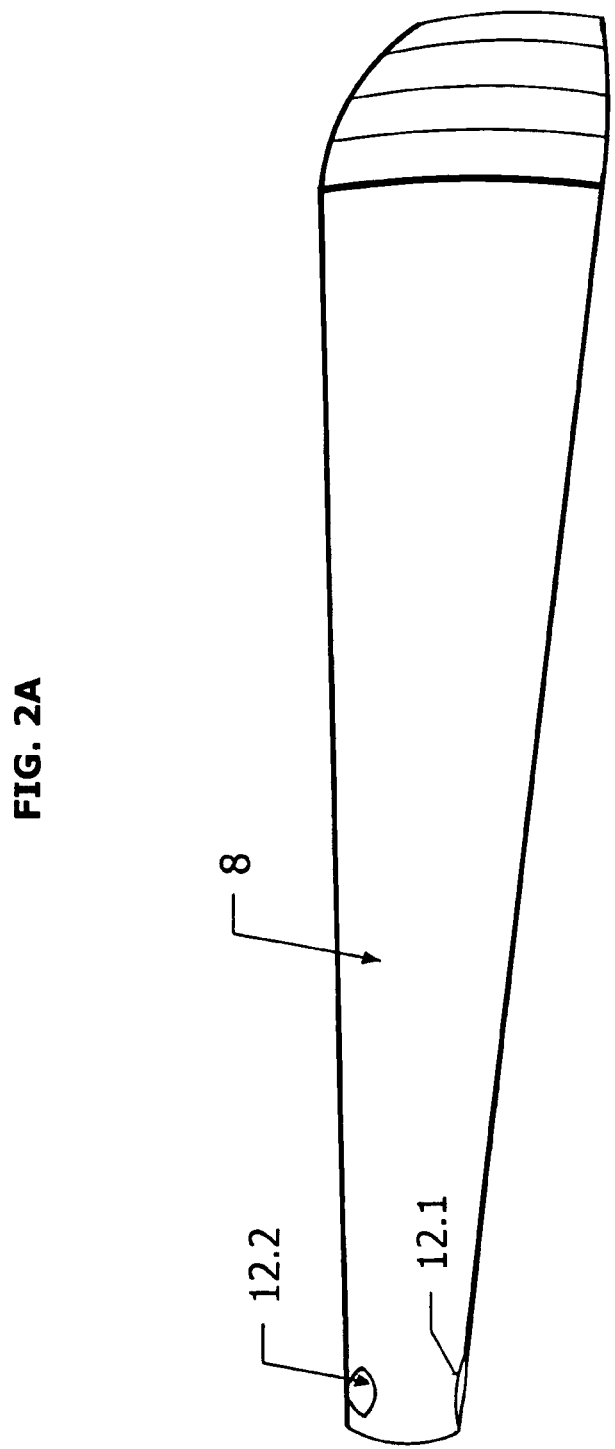

FIG. 2A is a top planform view of the non-planar elliptical winglet 12.1 and 12.2 and propellers 8 and 8.1 as shown in FIG. 1B. Whereby, the forward elliptical diameter/entrance 12.1 of the winglet geometry is of greater diameter than of the exit 12.2. The benefit of this type of winglet configuration 12.1 and 12.2 facilitates faster moving air through the cross-section of the winglet which when fluid is exiting draws slower moving air/fluid away from the wing tips by creating fast moving vortices—the Venturi effect. Downwash, vorticity and flow re-circulation at the trailing edge is then reduced as trailing vorticity is displaced from the plane at the tip of the propeller. FIG. 2B is a perspective, partial view of the propeller 8 and 8.1 depicted in FIG. 1B non-planar elliptical winglet 12.1 and 12.2, illustrating the blended recession of the non-planar elliptical winglet 12.1 and 12.2 into the tip of the propeller 8 and 8.1 airfoil geometry. FIG. 2C is a perspective cut away, partial top view of the non-planar elliptical winglet entrance 12.1 and exit 12.2 depicting the Venturi flow cross-section of the winglet 12.1 and 12.2 and airfoil geometry 8.2.

FIG. 3A is a representative view of the stator vanes 10 FIGS. 1B-1C with variable operation. The variable vanes 18 depicted in FIGS. 3B and 3C are in the closed position. A linear actuator/servo actuator 13 with a connecting linkage-strut 14 is attached to a stator vane crank arm 15 on the leading edge side of the variable stator vane crank arm 15. On the trailing edge side of the variable stator vane crank-arm 15, push pull rods 16 connects to another stator vane crank arm 15 in series and such series configuration can expand to a plurality of variable stator vanes 18 and fixed vane roots 17. The stator vane crank arm 15 is pivotally mounted via rod 19 to the stator vane fixed root 17 and the rod 19 is fixed mounted to a lower body of revolution—the actuation portion 18 of the stator vanes 17 and 18. As depicted in FIG. 3B, when the actuator rod FIG. 3A, 14 extends as indicated in the direction of travel by arrow 18.2, the connecting series of push-poll rods 16 FIG. 3A affixed to the bell crank arms 15, FIG. 3A, also move in the direction of arrow 18.2 and the variable body of revolution of the stator vane 18 pivots from 0 to 90 degrees as indicated by direction of travel arrows 18.1. The push-pull rods FIG. 3A, 16 and linkages mounted on the trailing edge side of the variable stator vanes FIG. 3A, 17 and 18 move in the direction as indicated by arrow 18.3, which is opposite the direction of travel of arrows 18.2. Variable stator vanes FIG. 3A, 17 and 18 are mounted in the lower surface of the annular wings FIGS. 1A-1D 1 and 2, circumferentially to the tangent wake flow and serve to disrupt fluid flow in the slipstream of the propellers, creating a pressure rise, which in turns slows propeller rpm. The variable stator vanes FIG. 3A-3C, 17 and 18 act as aerodynamic brakes to the propeller 8 and 8.1, FIG. 1B, when in full closed position, as depicted in FIGS. 3B-3C, propeller as shown in FIG. 1B, 8 and 8.1 operation is severely limited and slowed resulting in significant reduction of the propeller rpm. FIG. 3A is a top perspective view of the variable stator vanes in the full open position.

Figure 4A:
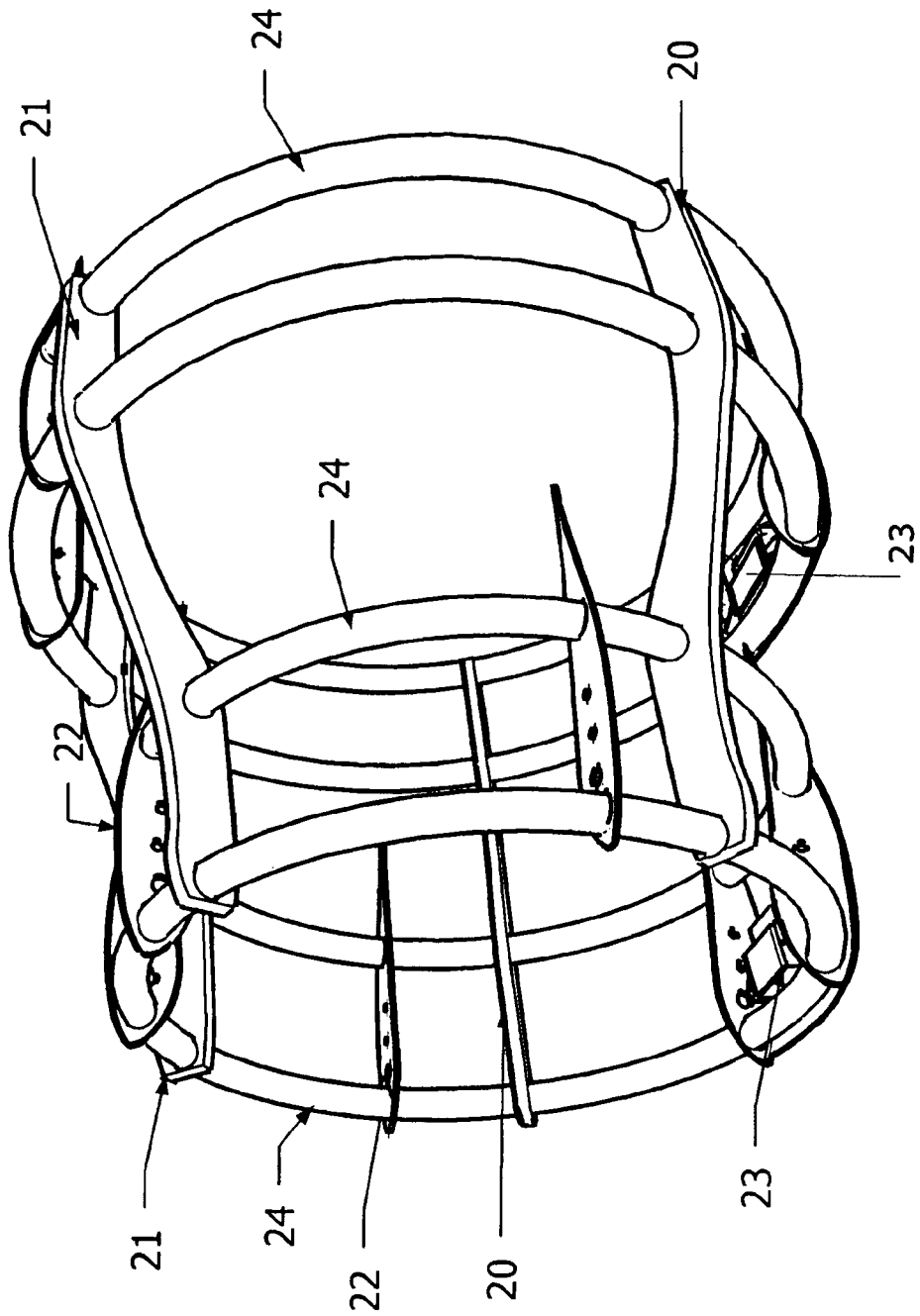

FIG. 4A is a framed-up view of the internal structure of the preferred embodiment. Two upper rib struts 21 and two lower rib struts 20 connect the frames of each annular wing. Enclosed in the lower section of each annular wing is a heating unit 23. Airfoil formers 22 provide the specific airfoil geometry and angle of incidence is set in place by tubular spars 24. The heating units 23 are placed strategically at the lower portion of the annular wing to allow for natural convection of heated air through the hollow frame. FIG. 4B is a close-up view of the internal mounted heating units 23 which may be sensor controlled to prevent ice-formation and buildup on the annular wings FIG. 1A, 1 and 2.

As shown in FIGS. 5A and 5B the horizontal stabilizers 9 can optionally be made operable for rotation about a pitch axis, operated by electro-mechanical apparatus 29.

A further embodiment of the invention is the realization that there is degraded flow across the annular wings and that flow can be enhanced by introduction of a Coanda effect flow placed at the rear of the annular wing. This can be applied to the wind turbine embodiments as described above and can also be applied to marine hydro kinetic turbine systems. The term aero-hydro kinetic refers to application in one or the other or both wind and water environments. Similarly the term "Wind-MHK refers to the application in one or the other or both wind and water environments.

Referring to FIGS. 6A through 8B an apparatus and method are shown to provide such improvement through active circulation control.

The active circulation control wing technology in the present embodiments involves blowing a small high-velocity jet over a highly curved surface at the trailing edge of an annular the wing in a stage of a turbine. This causes the boundary layer and the jet sheet to remain attached along the curved surface due to the Coanda effect and changes the trailing edge stagnation point. The resulting benefit is significantly higher lift coefficients than what might be realized on a conventional airfoil with or without passive load control devices.

The improvements in boundary layer control from active circulation control maximize flow efficiency throughout the second and first stages by minimizing losses from viscous effects, particularly induced and parasitic drag and flow separation. The power and efficiency augmentation benefit to the present embodiment from active circulation control are an increase in thrust force from high velocity jets resulting in lower pressure gradients, enabling higher propeller rpm or higher back pressure to velocity ratios. An additional benefit to the annular wing design from active circulation control is improved mass flow augmentation, particularly in the second stage annular wing, enabling the present embodiment to perform optimally at lower wind speeds and slower water currents.

Water turbines also referred to as ocean current turbines, tidal turbines, small hydro, run of river turbines, river turbines, in-line flow turbines are aggregated under the description of Marine Hydro Kinetic or MHK turbines throughout the description of the present embodiment. MHK turbines are deployed in rivers, oceans, bays, channels, dams and in-line flow piping for the purpose of converting the kinetic energy of flowing water into useful electrical power or mechanical work. MHK turbines may be fixed mounted or bottom mounted to the bed of a river, ocean, bay, channel or wall mounted to a pipe or orifice immersed in flowing water. MHK turbines may be buoyantly designed and tethered to the bed of a flowing body of water or tethered and suspended from buoyant structures in a flowing body of water.

Figure 6A:
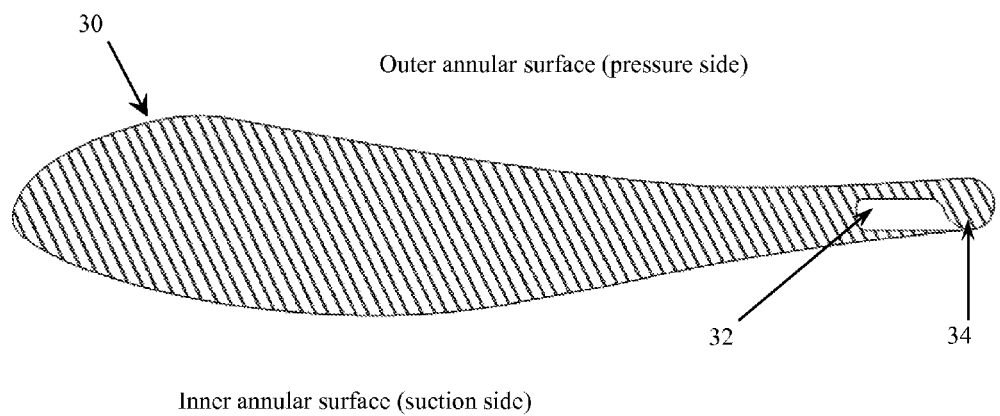
Figure 6B:
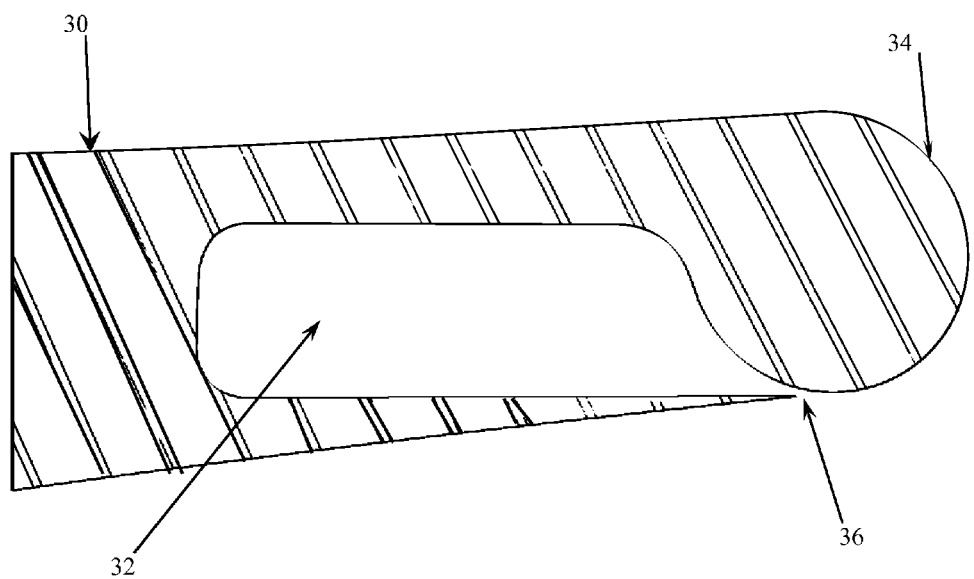

Enhancement to flow control functioning is the inclusion of active circulation control wing technology. FIG. 6A is a cross-sectional view of a laminar flow, annular wing geometry 30 of a wind or MHK turbine system annular wing stages 1 and/or 2 as depicted in FIGS. 1A-1E and in FIGS. 8A and 8B. The basic configuration of the circulation control aero-hydro annular wing 30 of FIG. 6A-6B consists of a plenum 32 and a circular shaped annular trailing edge 34. A fluid, air or water, is pumped into the plenum 32 and the high velocity fluid jet is then ejected through a nozzle 36. As the nozzle 36 is actually an annular slit the ejected flow is in the form of a sheet, The annular slit 36 is oriented with respect to the curvature of the annular trailing edge 34 such that the exiting flow is in the form of an annular sheet tangentially passing over the annular trailing edge 32 to cause the flowing annular fluid sheet to remain attached along the curved surface due to the Coanda effect. The flowing annular fluid sheet follows the curvature of the annular trailing edge 34 transitioning from the suction side of the aero-hydro wing 30 of FIG. 6A-6B to the pressure side of the aero-hydro wing 30. The result of the blowing of the high velocity annular fluid sheet is improved circulation around the entire aero-hydro wing 30, delay of the onset of flow separation, particularly in unsteady flows, and significant improvement in the sectional lift coefficient of the aero-hydro wing 30, greater than what might be realized with passive load control devices such as vortex generators 5 shown in FIGS. 1A-1B and FIG. 1D. The benefit to the Wind-MHK turbine system in the present embodiment from active circulation control is lower pressure gradients at the exit of the annular wing stages 1 and 2 of FIGS. 1A-1E as also shown FIGS. 8A and 8B, thereby improving revolutions per minute of propeller 8 and 8.1 of FIG. 1B and FIG. 1E. An additional benefit to the Wind-MHK turbine system is significant reduction of losses from viscous effects, particularly friction losses, parasitic and induced drag over a range of wind and water current velocities.

Figure 6C:
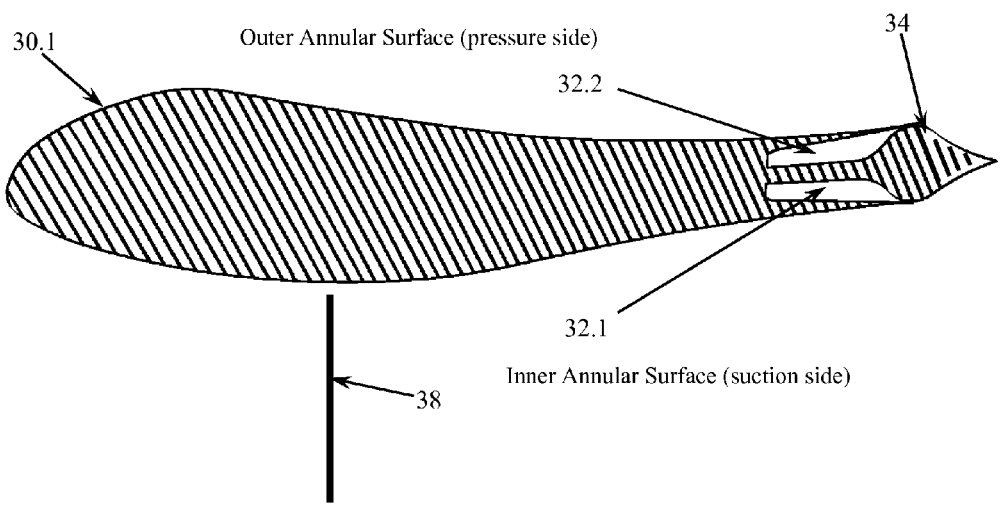
FIGS. 6C and 6D show an alternative iteration of active circulation control aero-hydro foil geometry for the embodiment.
Figure 6D:
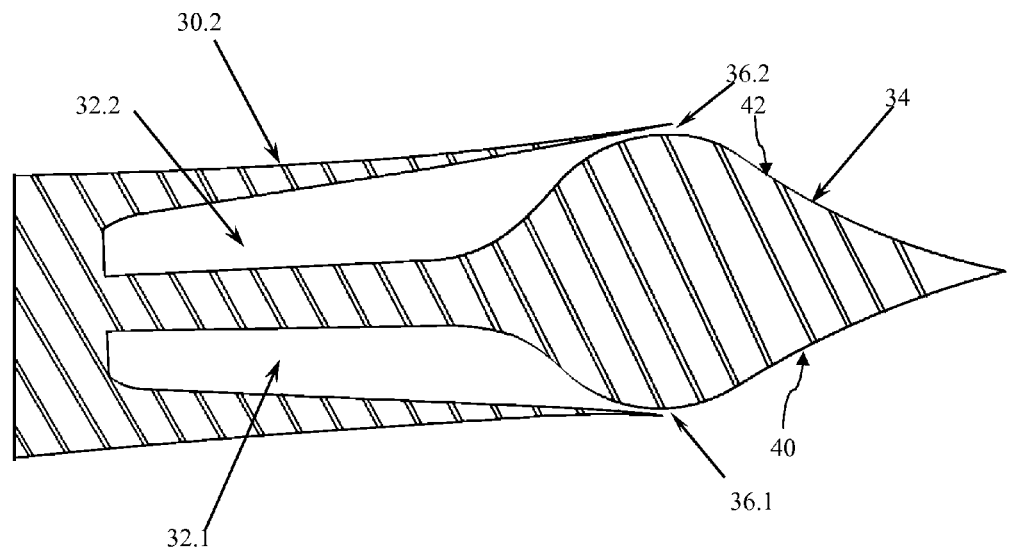
Figure 8A:
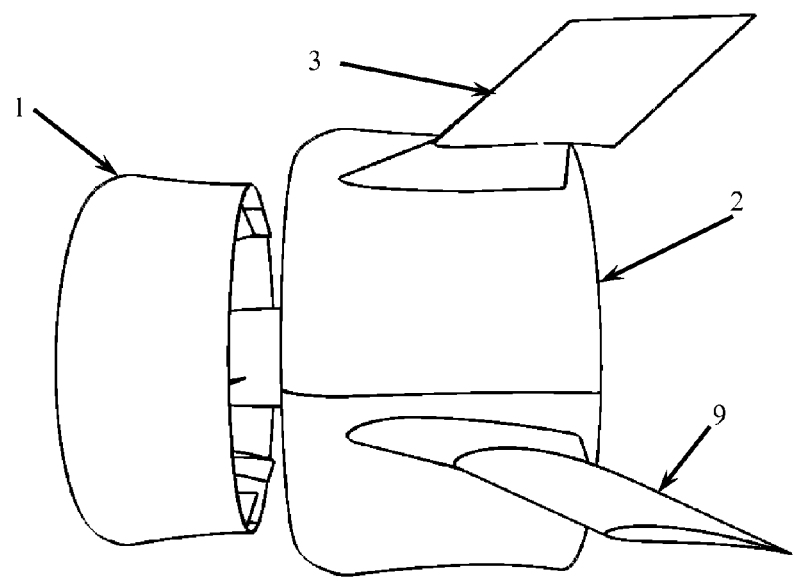
FIGS. 8A and 8B show an alternative configuration of the wind and marine hydro kinetic turbine system annular wing stages, vertical and horizontal stabilizer placement for optimization of active circulation control.
Figure 8B:
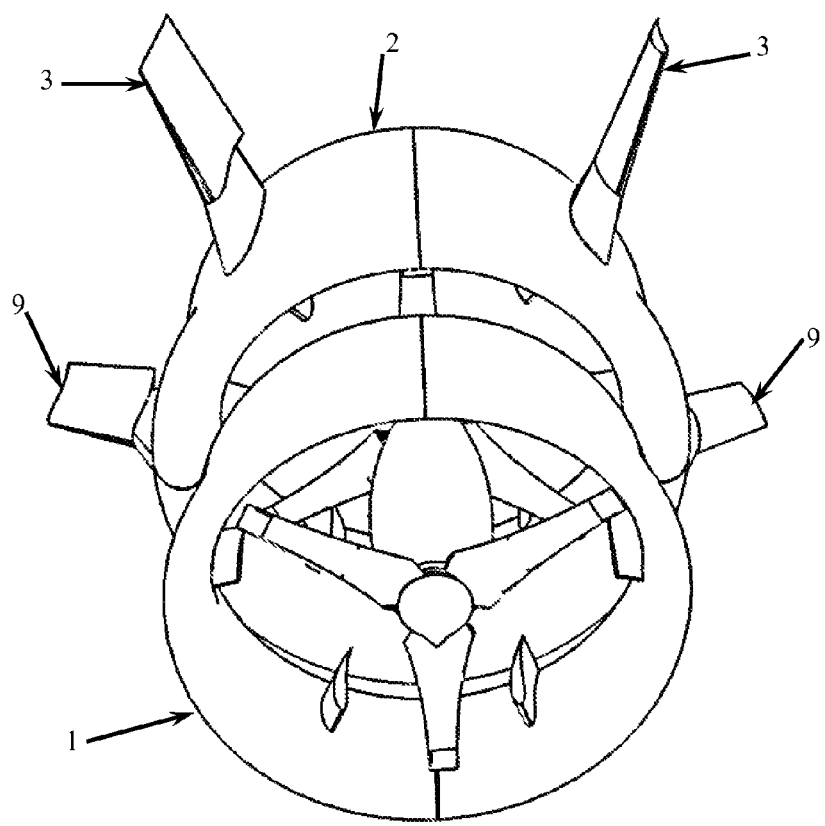

FIGS. 6C and 6D are sectional views of an alternate iteration for a laminar flow, circulation control aero-hydro annular wing 30.1 of the Wind MHK turbine annular wing stages 1 and 2 depicted in FIGS. 1A-1E and in FIGS. 8A and 8B. This aero-hydro annular wing iteration 30.1 consists of a first annular plenum 32.1 with first nozzle also called exit slit 36.1 located on the suction side, the inner annular side of the annular wing and a second annular plenum 30.2 with a second nozzle also called an exit slit 32.2 located on the pressure side, the outer annular surface of the annular wing. The nozzles 33.1 and 33.2 eject high velocity fluid, wind or water as an annular sheet along the curvature of the double trailing edge 34, each exit slit and resultant annular sheet being directed for tangential flow to respective first annular curvature portion 40 and second annular curvature portion 42 of the double trailing edge each of which commences with a curved portion at which the exit slits 36.1 and 36.2 are positioned for the annular fluid flow to be directed tangentially and thereby enable the Coanda effect.

The high velocity fluid annular sheets ejected from the nozzles 36.1 and 36.2 follow the curvature of the respective portions of double annular trailing edge 34 and the fluid annular sheets transition axially and downstream of the double trailing edge 34. The benefit of the aero-hydro annular wing 30.1 with double trailing edge 34 is to guide the ejected annular fluid sheets to flow axially thereby to minimize wake flow expansion downstream of the double trailing edge 34 in an array of Wind-MHK turbine systems. The benefits of lower pressure gradients at the exit of the annular wing stages 1 and 2, FIGS. 1A-1E, reduction of viscous losses, and significant improvement of lift coefficients are also realized.

FIG. 7A illustrates the general configuration of the active circulation control wing technology and incoming and exiting fluid flow 44 of the circulation control system of the present embodiment. It is presented as in a stage 2 structure (see FIGS. 8A and 8B), in which stabilizers 3 and 9 can be used for intake of the fluid. The annular wing 30 pictured also applies to the configuration of FIGS. 6C and 6D. Housed within a cavity in the annular wing 30 (and 30.1) is a fluid pump 48 which draws fluid in as shown and pumps it via conduit(s) 46 to the plenum 32. It is contemplated that the fluid will be distributed through a manifold to several attachment points around the annular plenum and also that it may be accessed by conduits to several stabilizers.

The approaching free stream fluid 44 enters the stabilizer 3 or 9 through an internal conduit 52 and the fluid flow travels through fluid pump 48 as a result of suction generated by the fluid pump 48. The fluid flow is dispensed at high velocity into the internal manifold 46. The high velocity fluid flow downstream of the fluid pump 48 flows to the internal plenum 32, and is then ejected through the nozzle (exit slit) 36 (FIG. 6B) into the free stream, following the curvature of the trailing edge 34 as a result of the Coanda effect.

Figure 7B:
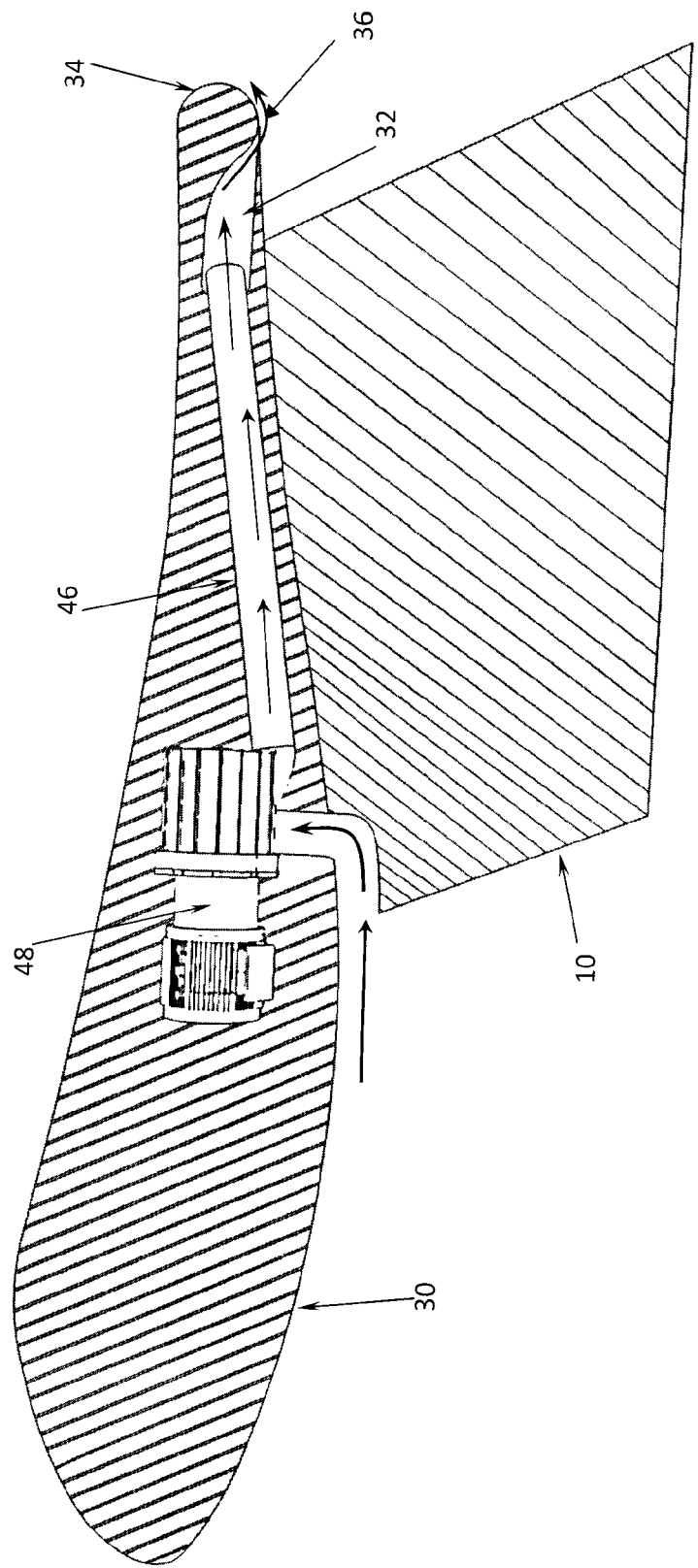
FIG. 7B shows the active circulation control installed in a stage 1 portion of a turbine.

FIG. 7B shows the active circulation control installed in a stage 1 portion of a turbine in which intake of fluid is accomplished through stator vanes 10 as described above.

FIGS. 8A and 8B present an alternate configuration of the vertical stabilizers 3 and horizontal stabilizers 9, (FIG. 1A-1B and 1D), mounted to the second stage annular wing 2, as optimal placement for active circulation control.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated.

What is claimed is:

1. An annular wing turbine wind and water system comprising:
    at least two separate annular wing stages connected in tandem axial configuration at least the rearmost of said stages having an active circulation control comprising:
        a specific annular wing geometry having an annular inner surface and an annular outer surface and an annular trailing edge, the inner surface geometry defining a suction side of the annular wing and the outer surface geometry defining a pressure side of the annular wing;
        an annular plenum chamber extending interiorly around the annular wing and having an annular exit slit pointing rearwardly for rearwardly exiting fluid from the plenum;
        the trailing edge being a rounded surface oriented with respect to the exit slot to define a rounded Coanda surface upon exiting of air or water as the case may be from the exit slot;
    whereby an exiting annular sheet of air or water from the plenum chamber flows along the rounded surface according to the Coanda principle.

2. The annular wing turbine system of claim 1 further wherein the rounded surface of the trailing edge defines a surface of the exit slot and continues into the plenum chamber.

3. An annular wing wind turbine system comprising:
    at least two separate annular wing stages connected in tandem axial configuration at least the rearmost of said stages having an active circulation control comprising:
        a specific annular wing geometry having an annular inner surface and an annular outer surface and an annular trailing edge, the inner surface geometry defining a suction side of the annular wing and the outer surface geometry defining a pressure side of the annular wing;

an annular plenum chamber extending interiorly around the annular wing and having an annular exit slit pointing rearwardly for rearwardly exiting fluid from the plenum;

the trailing edge being a rounded surface oriented with respect to the exit slot to define a rounded Coanda surface upon exiting of air or water as the case may be from the exit slot;

whereby an exiting annular sheet of air from the plenum chamber flows along the rounded surface according to the Coanda principle.

* * * * *